United States Patent [19]

Wani et al.

[11] Patent Number: 4,991,178
[45] Date of Patent: Feb. 5, 1991

[54] LASER APPARATUS

[75] Inventors: Koichi Wani; Yasuhiro Shimada; Hidehito Kawahara; Tadaaki Miki; Yoshiro Ogata, all of Osaka, Japan

[73] Assignee: Matsushita Electric Industrial Co., Ltd., Japan

[21] Appl. No.: 499,206

[22] Filed: Mar. 19, 1990

Related U.S. Application Data

[63] Continuation of Ser. No. 249,904, Sep. 27, 1988, abandoned.

[30] Foreign Application Priority Data

| Sep. 28, 1987 | [JP] | Japan | 62-243358 |
| Sep. 28, 1987 | [JP] | Japan | 62-243359 |
| May 31, 1988 | [JP] | Japan | 63-133329 |
| May 31, 1988 | [JP] | Japan | 63-133330 |
| Jun. 9, 1988 | [JP] | Japan | 63-142166 |
| Jun. 13, 1988 | [JP] | Japan | 63-145141 |
| Aug. 4, 1988 | [JP] | Japan | 63-194968 |
| Aug. 4, 1988 | [JP] | Japan | 63-194969 |
| Aug. 4, 1988 | [JP] | Japan | 63-194970 |
| Aug. 4, 1988 | [JP] | Japan | 63-194971 |

[51] Int. Cl.$^5$ .............................. H01S 3/11
[52] U.S. Cl. ..................... 372/32; 372/57; 372/33; 372/20; 372/108
[58] Field of Search ............ 372/99, 32, 102, 98, 372/108, 95, 57, 33

[56] References Cited

U.S. PATENT DOCUMENTS

| 4,241,319 | 12/1980 | Papayoanou | 372/102 |
| 4,429,398 | 1/1984 | Chenausky et al. | 372/102 |
| 4,434,490 | 2/1984 | Kavaya et al. | 372/32 |
| 4,435,808 | 3/1984 | JPX | 372/102 |
| 4,558,452 | 12/1985 | Guch, Jr. | 372/99 |
| 4,615,033 | 9/1986 | Nakano et al. | 372/99 |
| 4,615,034 | 9/1986 | Von Gunten et al. | 372/99 |
| 4,678,904 | 7/1987 | Saaski et al. | 250/227 |
| 4,823,354 | 4/1989 | Znotins et al. | 372/32 |
| 4,829,536 | 5/1989 | Kajiyama et al. | 372/99 |
| 4,845,716 | 7/1989 | Poehler et al. | 378/98 |

OTHER PUBLICATIONS

Applied Optics, vol. 13, No. 7, Jul. 1974, pp. 1625-1628; R. Wallenstein et al.: "Linear Pressure Tuning of a Multielement Dye Laser Spectrometer".

Optics and Laser Technology, vol. 18, No. 4, Aug. 1986, pp. 187-189; T. Henderson et al.: "Wavelength Stabilization System for a Pulsed or CW Laser".

Optics Communications, vol. 16, No. 3, Mar. 1976, pp. 324-327; A. Moriarty et al.: "A Frequency Doubled Pressure-Tunable Oscillator-Amplifier Dye Laser system".

Applied Optics, vol. 13, No. 9, Sep. 1974, pp. 2095-2099; R. Flach et al.: "Application of Pressure Scanning to the Tuning of a High Resolution Dye Laser".

European Search Report/ Abstract.

*Primary Examiner*—Léon Scott, Jr.
*Attorney, Agent, or Firm*—Lowe, Price, LeBlanc, Becker & Shur

[57] ABSTRACT

A laser apparatus includes an optical resonator having a laser medium and generating a laser light. A wavelength selection element selects a given wavelength of the laser light. The selected wavelength resides within a gain bandwidth of the laser medium. A sealed container houses the wavelength selection element. The sealed container may be filled with a gas. A density of the gas within the sealed container may be changed to vary the selected wavelength.

17 Claims, 11 Drawing Sheets

LASER APPARATUS

This application is a continuation of Application Ser. No. 07/249,904, filed Sept. 27, 1988, abandoned.

BACKGROUND OF THE INVENTION

This invention generally relates to a laser apparatus. For example, this invention specifically relates to a laser apparatus usable in an exposure system.

During the manufacture of large-scale integrated circuits, photolithography processes are used in printing patterns on semiconductor wafers. The photolithography processes are generally performed via exposure systems. Lasers are frequently used as light sources of the exposure systems. The manufacture of very large-scale integrated circuits requires shorter-wavelength light sources. Excimer lasers are applicable to such light sources.

Generally, an excimer laser using an optical resonator generates an oscillation line having a half-width of about 0.5 nm. To use such an excimer laser in the manufacture of very large-scale integrated circuits, it is necessary to decrease the half-width of its oscillation line to about 0.005 nm or less. The decrease in the width of the excimer laser oscillation line is conventionally realized by wavelength selectors such as a prism, a diffraction grating, or a Fabry-Perot etalon. These wavelength selectors are sensitive to temperature and pressure, so that changes in the temperature or pressure cause considerable variations in the selected wavelength. It is important to stabilize the wavelength of the light of the exposure system during the manufacture of very large-scale integrated circuits.

SUMMARY OF THE INVENTION

It is an object of this invention to provide a stable laser apparatus.

In a first laser apparatus of this invention, an optical resonator has a laser medium and generates a laser light. A wavelength selection element selects a given wavelength of the laser light. The selected wavelength resides within a gain bandwidth of the laser medium. A sealed container houses the wavelength selection element.

In a second laser apparatus of this invention, an optical resonator includes a laser medium and generates a laser light having a band of wavelengths which corresponds to a gain bandwidth of the laser medium. A sealed container is filled with a gas. A wavelength selection element disposed within the sealed container selects a wavelength of the laser light. The selected wavelength is variable within the gain bandwidth of the laser medium in accordance with a density of the gas within the sealed container. The selected wavelength determines a central wavelength of a laser light outputted from a combination of the optical resonator and the wavelength selection element. The density of the gas within the sealed container is changed to vary the central wavelength of the output laser light.

In a third laser apparatus of this invention, an optical resonator generates a laser light, and a sealed container is filled with a gas. A wavelength selection element disposed within the sealed container selects a wavelength of the laser light. A central wavelength of a laser light outputted from a combination of the optical resonator and the wavelength selection element is detected. A density of the gas within the sealed container is adjusted in accordance with the detected central wavelength of the output laser light to control the central wavelength of the output laser in a feedback manner.

In a fourth laser apparatus of this invention, an optical resonator outputs a laser light. A wavelength dispersion element disposed within a sealed container forms a spectrum pattern of the output laser light. The spectrum pattern is sensed. A wavelength of the output laser light is determined on the basis of the sensed spectrum pattern.

DESCRIPTION OF THE FIRST PREFERRED EMBODIMENT

Figure 1:
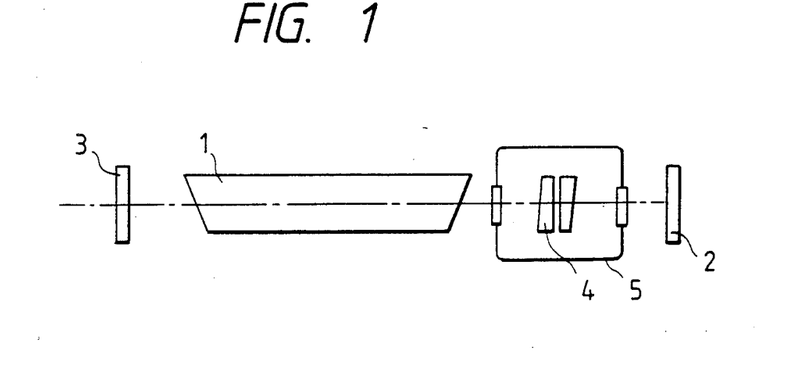
FIG. 1 is a diagram of a laser apparatus according to a first embodiment of this invention.

As shown in FIG. 1, a laser apparatus includes a discharge tube 1 extending between a total reflection mirror 2 and an output mirror 3. The discharge tube 1, the total reflection mirror 2, and the output mirror 3 form an optical resonator. The discharge tube 1 contains known excimer laser medium including a mixture of a rare gas and a halogen gas. In this laser apparatus, laser oscillation occurs at a frequency within an ultraviolet range. An air space etalon 4 is disposed between the discharge tube 1 and the total reflection mirror 2. An optical axis of the optical resonator extends through the air space etalon 4. The air space etalon 4 is composed of one type of a Fabry-Perot etalon, including a pair of parallel flat-face quartz plates opposed to and spaced from each other by a small gap. The air space etalon 4 is disposed within a sealed container 5.

The devices 1, 2, 3, and 5 are supported on a common base (not shown). In addition, the air space etalon 4 is supported on the wall of the sealed container 5 by suitable members (not shown).

Figure 2:
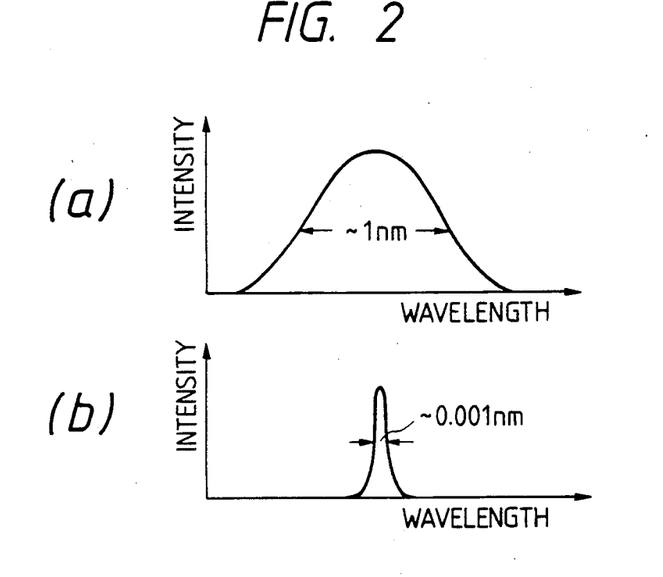
FIG. 2(a) is a graph showing the relationship between intensity and wavelength of light generated by a general excimer laser.
FIG. 2(b) is a graph showing the relationship between intensity and wavelength of light generated by the laser apparatus of FIG. 1.

As shown in FIG. 2(a), a general excimer laser has a gain bandwidth of about 1 nm. The air space etalon 4 decreases the gain bandwidth of the excimer laser to a value of about 0.001 nm as shown in FIG. 2(b). Generally, in cases where the air space etalon 4 is exposed to atmosphere, the central wavelength of the laser light varies by about 0.01 nm or less during the operation of the laser apparatus. The inventors and others found that, in cases where the air space etalon 4 was disposed within a sealed container 5 as in this embodiment, the variation in the central wavelength of the laser light was suppressed. The found effect seems to be based on the following reasons. The wavelength selected by the air space etalon 4 depends on the refractive index related to the gap of the air space etalon 4. The refractive index is determined solely by the density of gas in the gap of the air space etalon 4. In cases where the air space etalon 4 is exposed to atmosphere, as the pressure or temperature changes and thus the density of gas in the gap of the air space etalon 4 varies, the refractive index changes and thus, the selected wavelength shifts. In cases where the air space etalon 4 is disposed within a sealed container 5, the density of gas in the gap of the air space etalon 4 is independent of external pressure and temperature so that the refractive index remains unchanged even when the pressure or temperature varies. Accordingly, in the latter cases, the wavelength selected by the air space etalon 4 remains essentially constant independent of the pressure and temperature.

According to experiments, in the laser apparatus of this embodiment, the variation in the central wavelength of the laser light was held within a range of ±0.001 nm.

DESCRIPTION OF THE SECOND PREFERRED EMBODIMENTS

Figure 3:
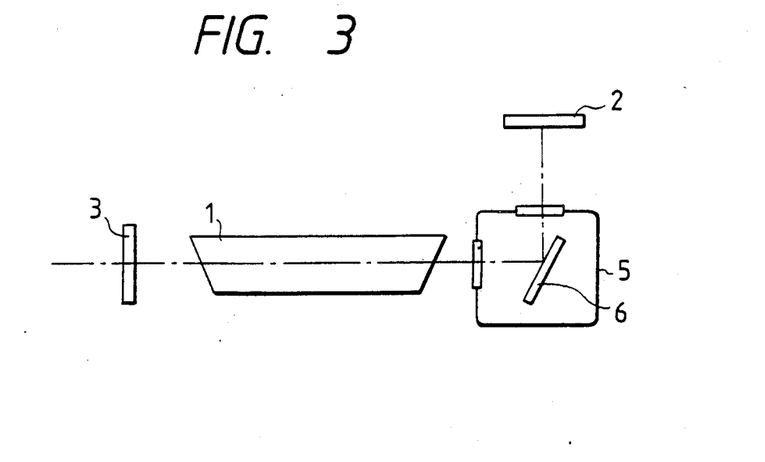
FIG. 3 is a diagram of a laser apparatus according to a second embodiment of this invention.

FIG. 3 shows a second embodiment of this invention which is similar to the embodiment of FIG. 1 except for the following design changes.

The embodiment of FIG. 3 uses a grating 6 in place of the air space etalon 4 (see FIG. 1). Light travels between mirrors 2 and 3 while being reflected by the grating 6. The grating 6 selects light having a predetermined wavelength. In general, the wavelength selected by a grating is determined by the density of gas surrounding the grating. Accordingly, the grating 6 is disposed within a sealed container 5 so that the wavelength selected by the grating 6 is held essentially constant.

DESCRIPTION OF THE THIRD PREFERRED EMBODIMENT

Figure 4:
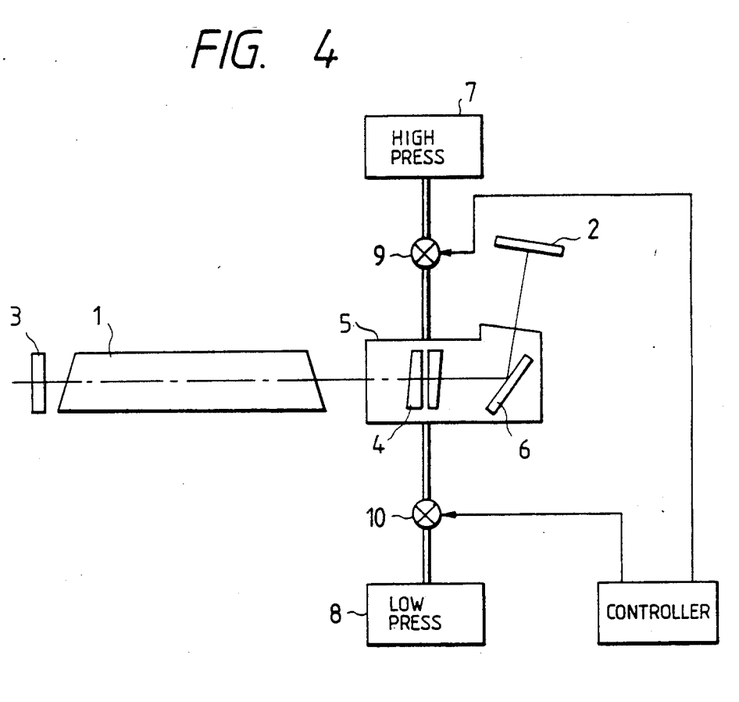
FIG. 4 is a diagram of a laser apparatus according to a third embodiment of this invention.

FIG. 4 shows a third embodiment of this invention which is similar to the embodiment of FIG. 1 except for the following design changes.

In the embodiment of FIG. 4, an air space etalon 4 and a grating 6 are disposed within a common sealed container 5. Light travels between mirrors 2 and 3 while being reflected by the grating 6 and passing through the air space etalon 4. The air space etalon 4 and the grating 6 select lights having predetermined wavelengths respectively. The wavelengths selected by the air space etalon 4 and the grating 6 are set equal so that the width of wavelengths of the laser light can be acceptably small. For example, the wavelength width is about 0.005 nm.

As in the embodiments of FIGS. 1 and 3, the wavelength selected by the air space etalon 4 and the grating 6 is essentially independent of pressure and temperature outside the sealed container 5. According to experiments, in the laser apparatus of this embodiment, the variation in the central wavelength of the laser light was held within a range of ±0.001 nm.

A high pressure air source 7 and a low pressure air source 8 are connected to the sealed container 5 via electrically-driven valves 9 and 10 respectively. When the valve 9 is opened but the valve 10 is closed, high pressure air enters the sealed container 5 and thus the density of air residing in the gap of the air space etalon 4 and surrounding the grating 6 increases so that the wavelength selected by the air space etalon 4 and the grating 6 varies in one direction. When the valve 9 is closed but the valve 10 is opened, low pressure air enters the sealed container 5 and thus the density of air residing in the gap of the air space etalon 4 and surrounding the grating 6 decreases so that the wavelength selected by the air space etalon 4 and the grating 6 varies in an opposite direction.

A controller 11 outputs control signals to the valves 9 and 10. An exposure system including the laser apparatus has a device (not shown) detecting a shift of the position of image formation. The control signals to the valves 9 and 10 are generated by the controller 11 in accordance with a signal from the detecting device so that the valves 9 and 10 are opened and closed in accordance with the shift of the position of the image formation. In other words, the density of air within the sealed container 5 is controlled in accordance with the shift of the position of the image formation.

During the operation of the laser apparatus, the air space etalon 4 and the grating 6 absorb the laser light and thereby the temperature of the devices 4 and 6 increases. This temperature increase would cause a variation in the central wavelength of the laser light and thus cause a shift of the position of image formation. The control of the density of air within the sealed container 5 in response to the shift of the position of the image formation is designed so as to compensate for such a variation in the central wavelength of the laser light caused by the temperature increase. This compensation control enables a more stabilized central wavelength of the laser light. The central wavelength of the laser light can be positively varied by changing the characteristics of the controller 11 or the detecting device. Accordingly, the laser apparatus of this embodiment is of the tunable type. The variable range of the central wavelength of the laser light is determined by a gain bandwidth of a laser medium contained in a discharge tube 1.

It should be noted that various modifications may be made in this embodiment. In a first example, the sealed container 5 including the air space etalon 4 and the grating 6 is disposed between the discharge tube 1 and the output mirror 3. In a second example, the grating 6 and the total reflection mirror 2 are formed by a common optical device. In a third example, the grating 6 and the output mirror 3 are formed by a common optical device. In a fourth example, the grating 6 is replaced with a prism or a solid etalon. In a fourth example, one of the air space etalon 4 and the grating 6 is disposed outside the sealed container 5.

DESCRIPTION OF THE FOURTH PREFERRED EMBODIMENT

Figure 5:
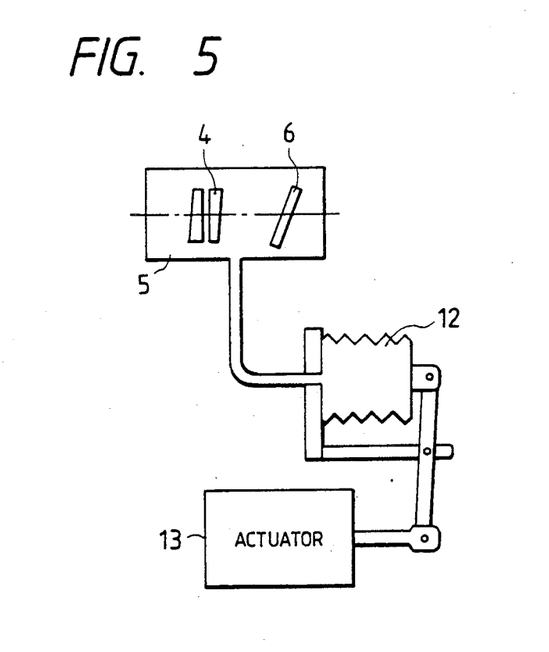
FIG. 5 is a diagram of part of a laser apparatus according to a fourth embodiment of this invention.

FIG. 5 shows a fourth embodiment of this invention which is similar to the embodiment of FIG. 4 except for the following design changes.

The embodiment of FIG. 5 uses a combination of bellows 12 and an actuator 13 in place of the combination of the high pressure air source 7, the low pressure air source 8, and the valves 9 and 10 (see FIG. 4). A sealed container 5 is connected to the bellows 12 so that the pressure or the density of air within the sealed container 5 can be varied by expanding or contracting the bellows 12. The bellows 12 is driven by the actuator 13.

It should be noted that air within the sealed container 5 may be replaced with other gases such as a nitrogen gas, a rare gas, or an inert gas.

DESCRIPTION OF THE FIFTH PREFERRED EMBODIMENT

Figure 6:
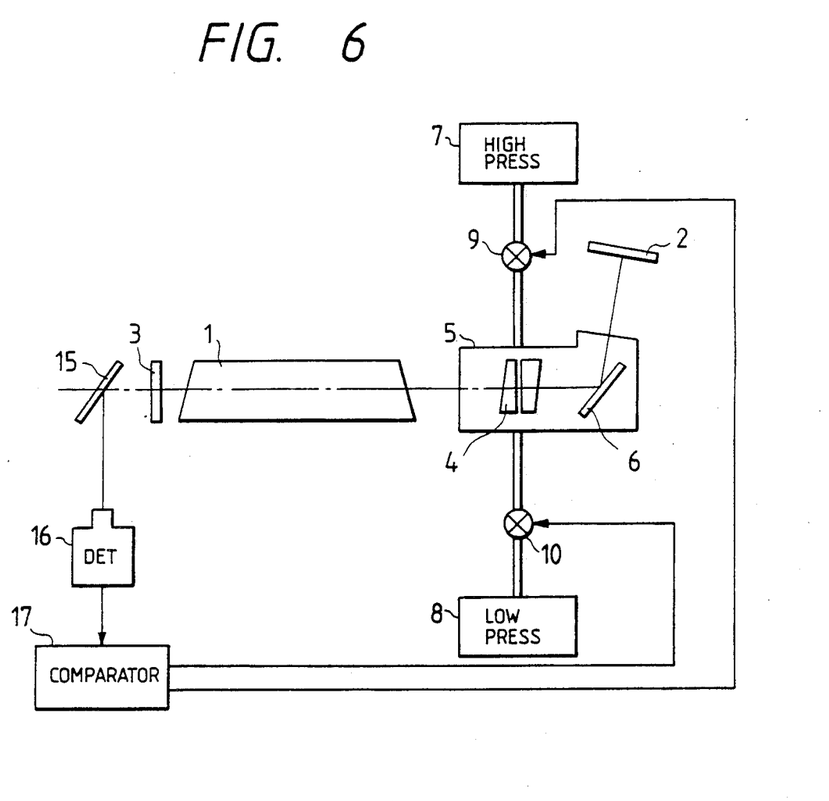
FIG. 6 is a diagram of a laser apparatus according to a fifth embodiment of this invention.

FIG. 6 shows a fifth embodiment of this invention which is similar to the embodiment of FIG. 4 except for the following design changes.

The embodiment of FIG. 6 includes a beam splitter or a semitransparent mirror 15 exposed to laser light emitted via an output mirror 3. A portion of the output laser light passes through the semitransparent mirror 15. Another portion of the output laser light is reflected by the semitransparent mirror 15, entering a wavelength detector 16. The wavelength detector 16 outputs a signal which represents the central wavelength of the output laser light. The output signal from the wavelength detector 16 is applied to a comparator 17. A reference signal representative of a reference wavelength is also applied to the comparator 17. The device 17 compares the output signal from the wavelength detector 16 with the reference signal, generating control signals which depend on a difference between the detected central wavelength of the output laser light and the reference wavelength. Valves 9 and 10 are driven by the control signals from the comparator 17, so that the valves 9 and 10 are controlled in accordance with a difference between the detected wavelength and the reference wavelength. The control of the valves 9 and 10 is designed so that the central wavelength of the output laser light can be held essentially at the reference wavelength. In this way, the central wavelength of the output laser light is cotrolled in a feedback manner. The central wavelength of the output laser light can be positively varied by changing the reference signal applied to the comparator 17. The variable range of the central wavelength of the laser light is determined by a gain bandwidth of a laser medium contained in a discharge tube 1.

Figure 7:
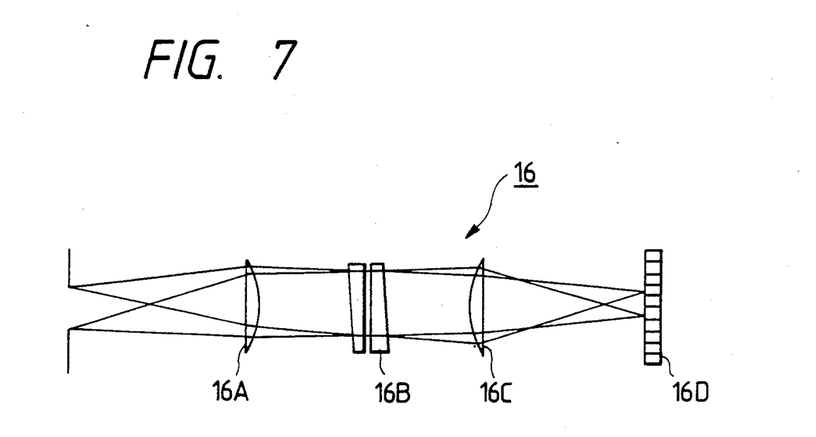
FIG. 7 is a diagram of the wavelength detector of FIG. 6.

As shown in FIG. 7, the wavelength detector 16 includes a combination of a lens 16A, a Fabry-Perot etalon 16B, and a lens 16C which forms an image of a band pattern of the laser light on a linear image sensor 16D. An output signal from the linear image sensor 16D varies as a function of the central wavelength of the laser light.

DESCRIPTION OF THE SIXTH PREFERRED EMBODIMENT

Figure 8:
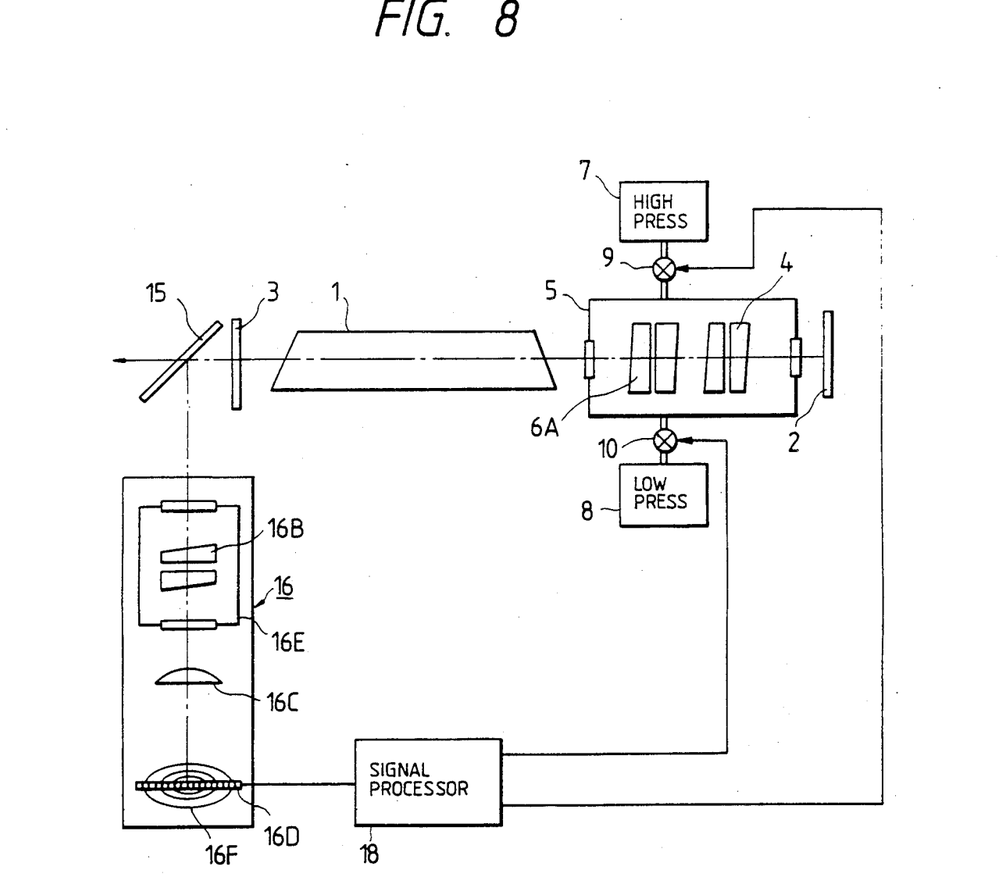
FIG. 8 is a diagram of a laser apparatus according to a sixth embodiment of this invention.

FIG. 8 shows a sixth embodiment of this invention which is similar to the embodiment of FIGS. 6 and 7 except for the following design changes.

The embodiment of FIG. 8 uses an air space etalon 6A in place of a grating 6 (see FIG. 6). The air space etalon 6A and another air space etalon 4 have different free spectral ranges. A lens 16A of a wavelength detector 16 is omitted from the embodiment of FIG. 8.

In the wavelength detector 16, an air space etalon or a Fabry-Perot etalon 16B is disposed within a sealed container 16E. Since the refractive index of gas is determined solely by the density of the gas as described previously, the refractive index related to a gap of the air space etalon 16B remains essentially constant. Accordingly, the characteristics of the wavelength detector 16 are essentially independent of temperature and pressure outside the sealed container 16E. The sealed container 16E is preferably filled with a nitrogen gas, a rare gas, or an inert gas. The combination of the air space etalon 16B and the lens 16C forms an image of a spectrum of the laser light on the linear image sensor 16D. The image takes a pattern of concentrical fringes 16F. The positions of the fringes 16F are detected by the linear image sensor 16D. It should be noted that the positions of the fringes 16F depend on the central wavelength of the laser light.

An output signal from the linear image sensor 16D which represents the positions of the fringes 16F is applied to a signal processor 18. The signal processor 18 determines the position of predetermined one of the fringes 16F by processing the output signal from the linear image sensor 16D. The signal processor 18 calculates the central wavelength of the laser light from the determined fringe position and determines a difference between the calculated central wavelength and a setting wavelength. The signal processor 18 generates control signals in accordance with the difference between the central wavelength of the laser light and the setting wavelength. Valves 9 and 10 are driven by the control signals from the signal processor 18 so that the valves 9 and 10 are controlled in accordance with the difference between the two wavelengths. The control of the valves 9 and 10 is designed so that the central wavelength of the laser light can be held essentially at the setting wavelength given in the signal processor 18. The central wavelength of the laser light can be positively varied by changing the setting wavelength. Since the wavelength detection via the device 16 is independent of variations in the temperature and the pressure as described previously, the control of the central wavelength of the laser light can be accurate.

DESCRIPTION OF THE SEVENTH PREFERRED EMBODIMENT

Figure 9:
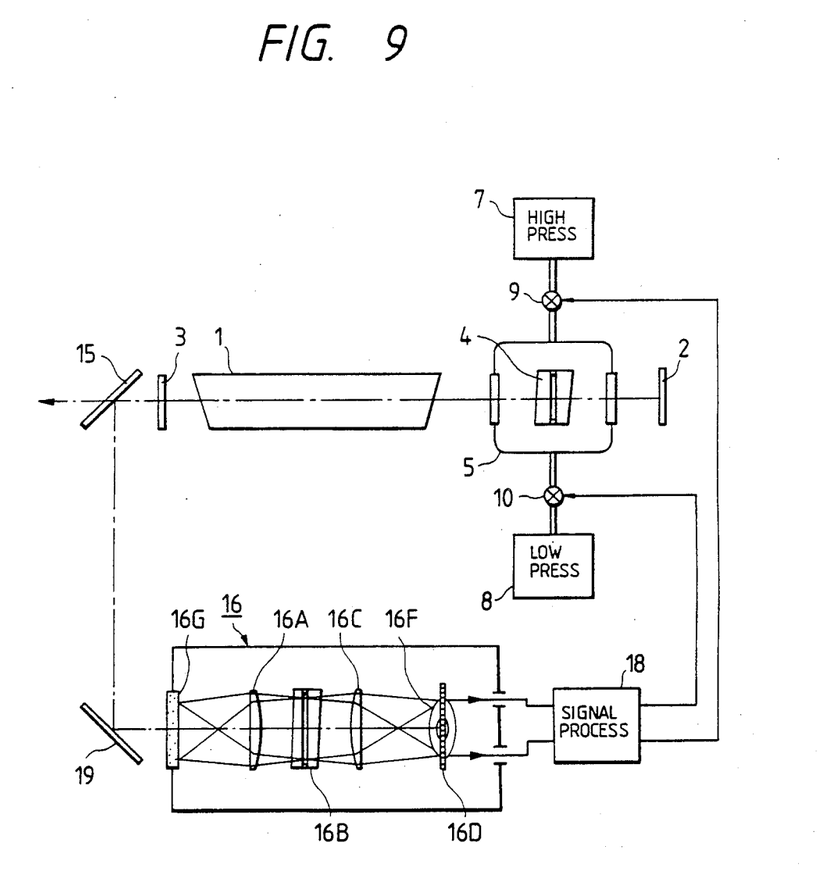
FIG. 9 is a diagram of a laser apparatus according to a seventh embodiment of this invention.

FIG. 9 shows a seventh embodiment of this invention which is similar to the embodiment of FIG. 8 except for the following design changes.

The embodiment of FIG. 9 includes a mirror 19 directing the laser light from a semitransparent mirror 15 toward a wavelength detector 16. An air space etalon 6A (see FIG. 8) is omitted from the embodiment of FIG. 9.

The laser light enters the wavelength detector 16 via an optical front plate 16G. The wavelength detector 16 includes a combination of a lens 16A, an air space etalon 16B, and a lens 16C which forms an image of a spectrum of the laser light on a plane where a linear image sensor 16D is located. The image takes a pattern of concentrical fringes 16F. The linear image sensor 16D is positioned relative to the fringes 16F so as to extend through the center of the fringes 16F. The positions of the fringes 16F are detected via the linear image sensor 16D.

A signal processor 18 determines a diameter of predetermined one of the fringes 16F by processing an output signal from the linear image sensor 16D. The signal processor 18 calculates the central wavelength of the laser light from the determined fringe diameter and determines a difference between the calculated central wavelength and a setting wavelength. The signal processor 18 generates control signals in accordance with the difference between the central wavelength of the laser light and the setting wavelength. Valves 9 and 10 are driven by the control signals from the signal processor 18 so that the valves 9 and 10 are controlled in accordance with the difference between the two wavelengths.

If the air space etalon 16B and the linear image sensor 16D move out of a normal positional relationship due to some factors, the diameters of the fringes 16F vary to a degree less than a degree of the movement of the devices 16B and 16D. Accordingly, the central wavelength of the laser light can be accurately detected via the wavelength detector 16 for a long time. The accurate wavelength detection enables accurate control of the central wavelength of the laser light.

Figure 10:
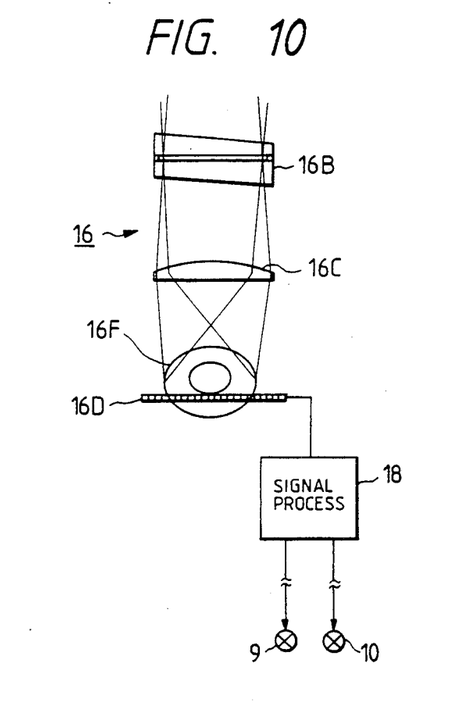
FIG. 10 is a diagram of a wavelength detector, a signal processor, and valves in a first modification of the embodiment of FIG. 9.
Figure 11:
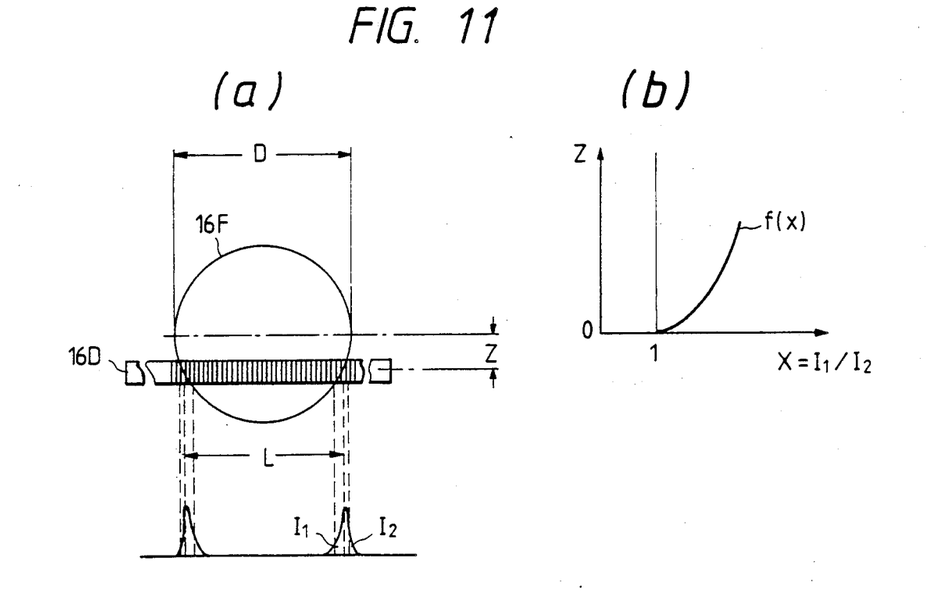
FIG. 11(a) is a diagram showing the fringe, the linear image sensor, and a light intensity signal in the modification of FIG. 10.
FIG. 11(b) is a graph showing the relationship between the degree of the non-symmetry of the light intensity signal and the distance beween the center of the fringe and the linear image sensor in the modification of FIG. 10.

FIG. 10 shows a first modification of the embodiment of FIG. 9. In this modification, a linear image sensor 16D is offset from diameters of concentrical fringes 16F. A signal processor 18 determines the diameter of predetermined one of the fringes 16F by processing an output signal from the linear image sensor 16D. As shown in FIG. 11(a), a light sensitive portion of the linear image sensor 16D has a uniformely distributed area. Accordingly, in cases where the linear image sensor 16D is offset from the diameters of the fringes 16F, a light intensity signal outputted from the linear image sensor 16 has a non-symmetrical shape. As shown in FIG. 11(b), a distance "z" between the center of the fringes 16F and the linear image sensor 16D varies in accordance with a given function "f" of "x" which equals a ratio between the integrals I1 and I2 of the signal intensity in both sides of a peak in the light intensity signal and which represents a degree of the non-symmetry of the light intensity signal. The diameter D of predetermined fringe is calculated by referring to the following equation:

$$D = (L^2 + 4z^2)^{\frac{1}{2}}$$

where the letter L denotes the distance between the points at which the predetermined fringe crosses the linear image sensor 16D.

Figure 12:
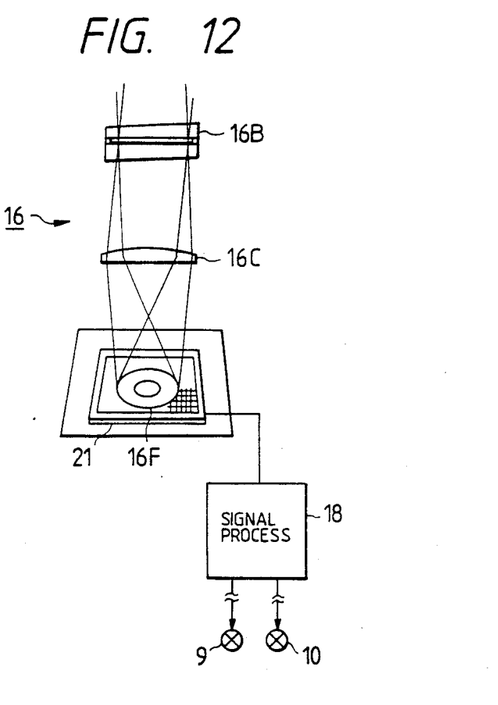
FIG. 12 is a diagram of a wavelength detector, a signal processor, and valves in a second modification of the embodiment of FIG. 9.

FIG. 12 shows a second modification of the embodiment of FIG. 9. This modification uses a two dimensional image sensor 21 in place of a linear image sensor 16D (see FIG. 9). A signal processor 18 determines a diameter of predetermined one of fringes 16F by processing an output signal from the two dimensional image sensor 21.

DESCRIPTION OF THE EIGHTH PREFERRED EMBODIMENT

Figure 13:
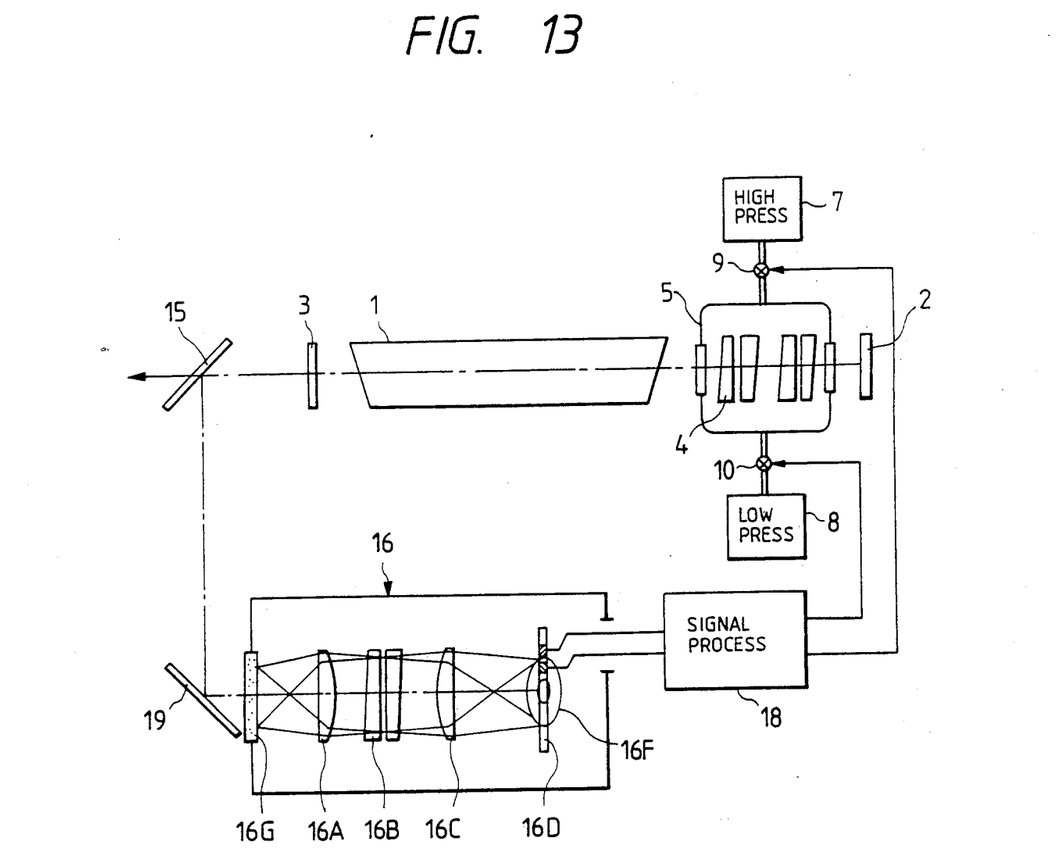
FIG. 13 is a diagram of a laser apparatus according to an eighth embodiment of this invention.
Figure 14:
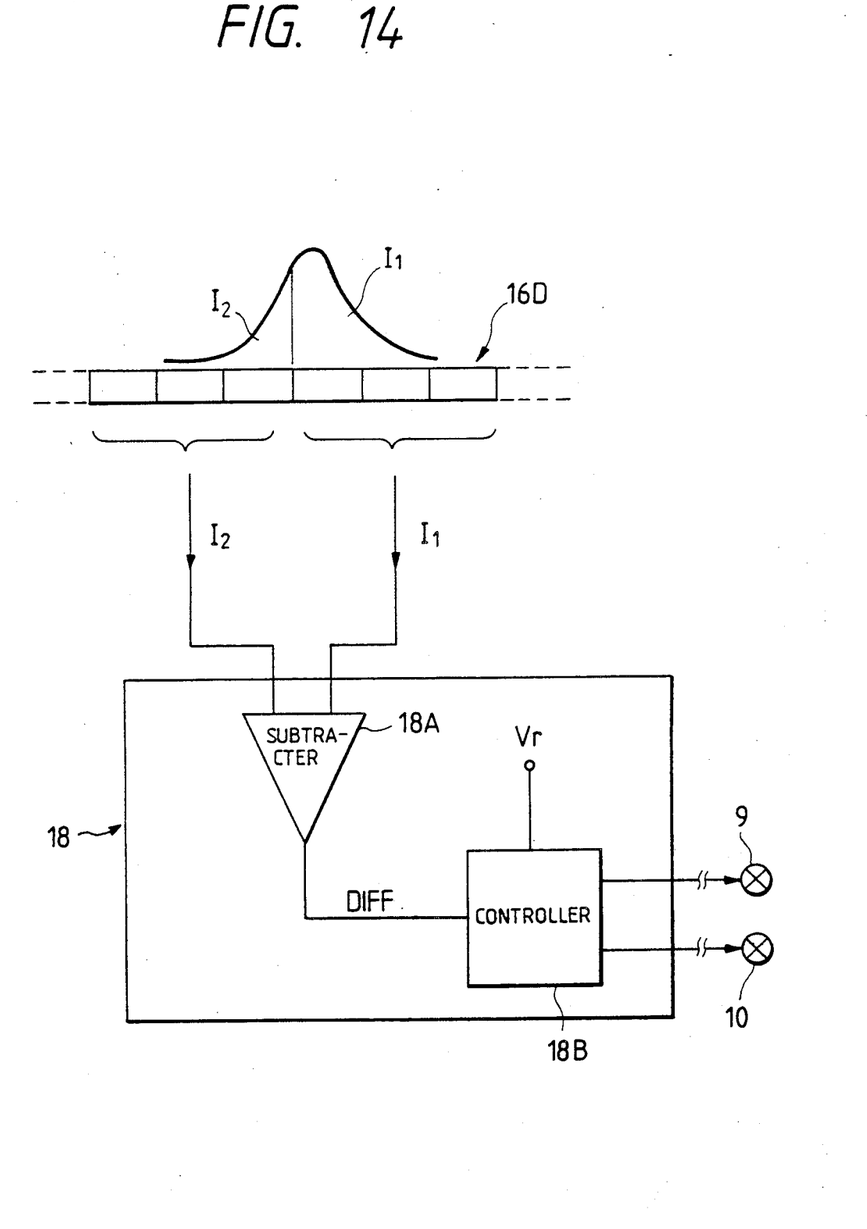
FIG. 14 is a diagram of the linear image sensor, the signal processor, and the valves of FIG. 13.

FIGS. 13 and 14 show an eighth embodiment of this invention which is similar to the embodiment of FIG. 9 except for the following design changes.

In the embodiment of FIGS. 13 and 14, air space etalons 4 and 6A are disposed within a common sealed container 5. As best shown in FIG. 14, a linear image sensor 16D includes a linear array of photo sensitive cells forming respective sensor channels.

A signal processor 18 processes output signals from the respective channels of the linear image sensor 16D and thereby calculates an integral I1 of the intensity of the laser light on an area of the linear image sensor 16D which extends inward of a boundary between reference cells of the sensor 16D. In addition, the signal processor 18 calculates an integral I2 of the intensity of the laser light on an area of the linear image sensor 16D which extends outward of the boundary between the reference cells of the sensor 16D. The signal processor 18 includes a subtracter 18A deriving a difference DIFF between the integrals I1 and I2. The signal processor 18 also includes a controller 18B outputting control signals to valves 9 and 10. A reference signal representative of a reference value Vr is applied to the controller 18B. The controller 18B adjusts the valves 9 and 10 via the control signals so that the difference DIFF can be essentially equal to the reference value Vr. Since the difference DIFF depends on the position of a peak of the intensity of the laser light on the linear image sensor 16D, the adjustment of the valves 9 and 10 enables the position of the peak of the light intensity to be held essentially at a reference position corresponding to the reference value Vr. In addition, since the position of the peak of the light intensity depends on the central wavelength of the laser light, the adjustment of the valves 9 and 10 enables the central wavelength of the laser light to be held essentially at a reference wavelength determined by the reference value Vr. As the reference value Vr is varied continuously, the central wavelength of the laser light is changed continuously without any limitation related to spaces between the cells of the linear image sensor 16D.

According to experiments, the accuracy in controlling and setting the central wavelength of the laser light was within a range below 0.5 pm.

Reflecting film coats on surfaces of the air space etalons 4 and 6A tend to be deteriorated. This phenomenon seems to be caused in the following processes. Oxygen is activated by absorbing the laser light. The activated oxygen bonds to atoms of the film coats. This reaction deteriorates the film coats.

According to experiments, in cases where the pressure in the sealed container 5 was adjusted within a low pressure range around 1 Pa, the life of the film coats of the air space etalons 4 and 6 was longer by a factor of about 100 than that obtained under conditions where the pressure in the sealed container 5 was around the atmospheric pressure. The longer life seems to result from the fact that the reduction of the pressure in the sealed container 5 lowers the density of oxygen in the sealed container 5.

Accordingly, it is preferable that the pressure in the sealed container 5 is adjusted within a range below the atmospheric pressure. In addition, the sealed container 5 may be filled with a nitrogen gas, a rare gas, or an inert gas.

Figure 15:
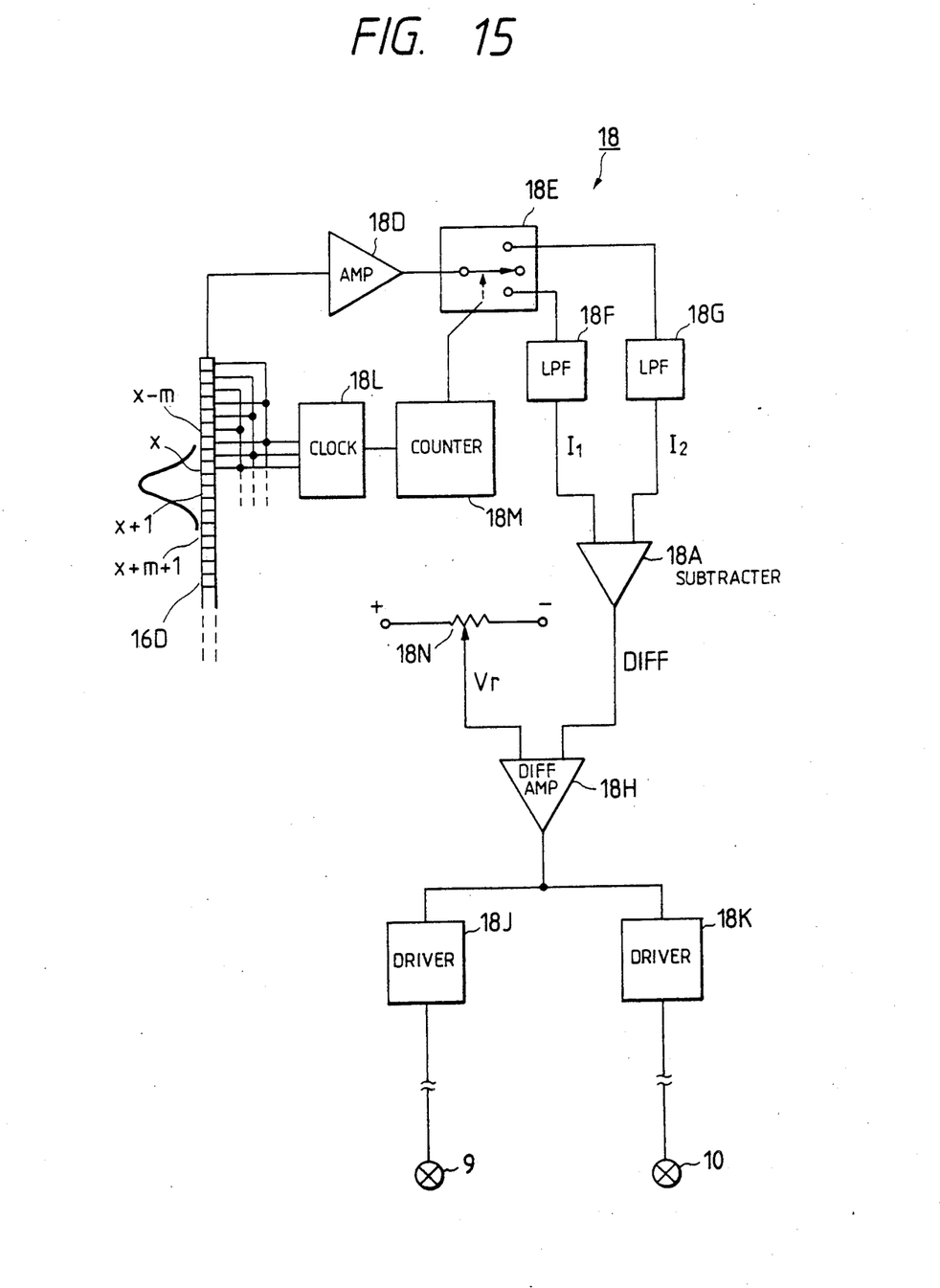
FIG. 15 is a diagram of a linear image sensor, a signal processor, and valves in a modification of the embodiment of FIG. 13.

FIG. 15 shows a modification of the embodiment of FIGS. 13 and 14. In this modification, a linear image sensor 16D is of a scanning type, and incident light signals are sequentially read out from respective channels of the linear image sensor 16D in accordance with three-phase clocks fed from a clock generator 18L within a signal processor 18. The output signals from the linear image sensor 16D are transmitted to a switch 18E via an amplifier 18D within the signal processor 18. A counter 18M controls the switch 18E in response to pulses from the clock generator 18L so that the output signals from the (x-m)-th channel to the x-th channel of the linear image sensor 16D are passed to an integrator or low pass filter 18F and that the output signals from the (x+1)-th channel to the (x+m+1)-th channel of the linear image sensor 16D are passed to an integrator or low pass filter 18G. The x-th channel is a reference adjacent to a predetermined fringe. The measurement width "m" is set around the bandwidth of the predetermined fringe. The low pass filter 18F generates a signal I1 representing an integral of the received signals. The low pass filter 18G generates a signal I2 representing an integral of the received signals. A subtracter 18A generates a signal DIFF representing a difference between the integrated intensity signals I1 and I2. The difference signal DIFF is applied to a differential amplifier 18H. A potentiometer 18N generates a reference signal Vr representing a reference value. The reference signal Vr is applied to the differential amplifier 18H. The differential amplifier 18H compares the difference signal DIFF and the reference signal Vr and generates a signal dependent on a difference between the signals DIFF and Vr. A driver 18J generates a control signal on the basis of the output signal from the differential amplifier 18H. A driver 18K generates a control signal on the basis of the output signal from the differential amplifier 18H. The control signals are transmitted from the drivers 18J and 18K to valves 9 and 10 respectively. The valves 9 and 10 are driven by the control signals so that the difference signal DIFF can be equal to the reference signal Vr. As a result, the position of the predetermined fringe is held essentially at a reference position determined by the reference signal Vr. In addition, the central wavelength of the laser light is held essentially at a reference wavelength determined by the reference signal Vr. The central wavelength of the laser light can be varied by adjusting the potentiometer 18N to change the reference signal Vr.

DESCRIPTION OF THE NINTH PREFERRED EMBODIMENT

Figure 16:
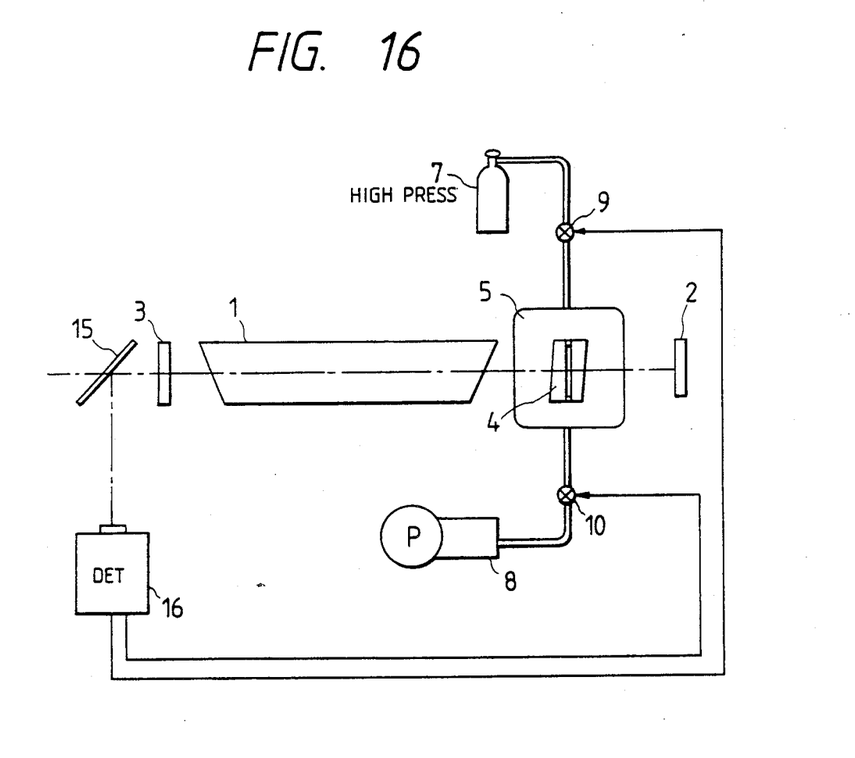
FIG. 16 is a diagram of a laser apparatus according to a ninth embodiment of this invention.

FIG. 16 shows a ninth embodiment of this invention which is similar to the embodiment of FIG. 9 except for the following design changes.

In the embodiment of FIG. 16, laser light reflected by a semitransparent mirror or a beam splitter 15 is directly applied to a wavelength detector 16. A valve 9 connected between a high pressure gas source 7 and a sealed container 5 is controlled in response to an output signal from the wavelength detector 16. A valve 10 connected between the sealed container 5 and a low pressure source or pump 8 is also controlled in response to another output signal from the wavelength detector 16. Accordingly, the pressure or the density of gas within the sealed container is controlled in accordance with the detected wavelength of the laser light.

The gas supplied from the high pressure gas source 7 to the sealed container is preferably a nitrogen gas, a rare gas, or an inert gas. The gas is most preferably a helium gas or an argon gas from the standpoint of the life of film coats on surfaces of an air space etalon 4.

DESCRIPTION OF THE TENTH PREFERRED EMBODIMENT

Figure 17:
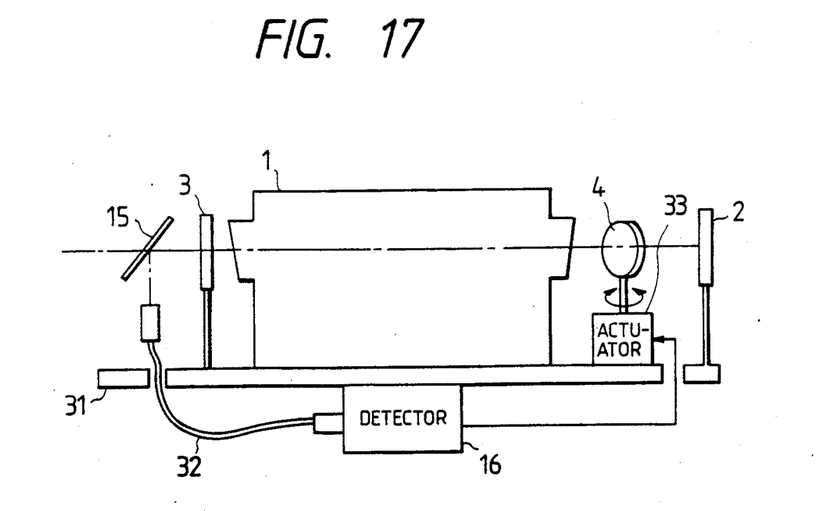
FIG. 17 is a diagram of a laser apparatus according to a tenth embodiment of this invention.

FIG. 17 shows a tenth embodiment of this invention which is similar to the embodiment of FIG. 16 except for the following design changes.

In the embodiment of FIG. 17, a discharge tube 1, a total reflection mirror 2, and an output mirror 3 are supported on a common base 31. An etalon 4 disposed between the discharge tube 1 and the total reflection mirror 2 is exposed. An angle of the etalon 4 is adjustable relative to an optical axis of an optical resonator composed of the devices 1-3. The wavelength selected by the etalon 4 depends on the angle of the etalon 4. The etalon 4 is driven by an actuator 33 supported on the base 31. Laser light reflected by a beam splitter 15 is guided to a wavelength detector 16 via an optical fiber cable 32. The wavelength detector 16 is fixed to the base 31. The actuator 33 is driven in response to an output signal from the wavelength detector 16 so that the angle of the etalon 4 is controlled in accordance with the detected wavelength of the laser light. The control of the angle of the etalon 4 is designed so that the wavelength of the output laser light can be essentially equal to a setting wavelength.

The base 31 is preferably made of metal. The discharge tube 1 and the wavelength detector 16 are located at opposite sides of the base 31 respectively so that electromagnetic noises from the discharge tube 1 interfere with the wavelength detector 16 to a negligible degree.

DESCRIPTION OF THE ELEVENTH PREFERRED EMBODIMENT

Figure 18:
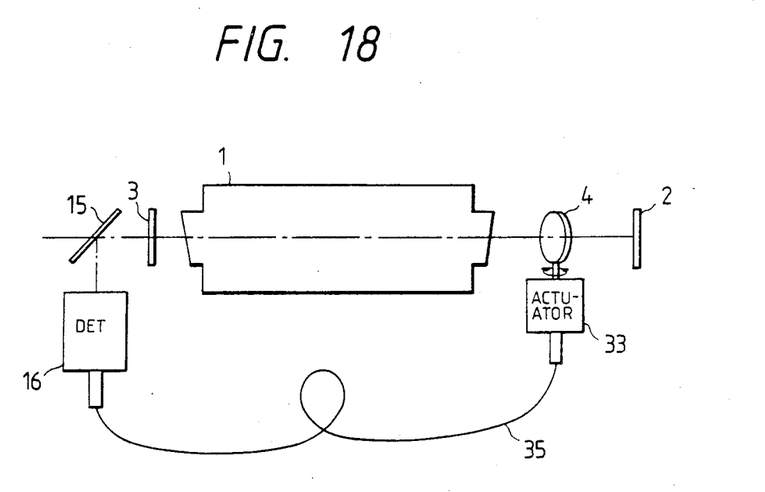
FIG. 18 is a diagram of a laser apparatus according to an eleventh embodiment of this invention.

FIG. 18 shows an eleventh embodiment of this invention which is similar to the embodiment of FIG. 17 except for the following design changes.

In the embodiment of FIG. 18, a wavelength detector 16 outputs an optical control signal to an etalon actuator 33 via an optical fiber cable 35. Accordingly, the output signal from the wavelength detector 16 is protected from electromagnetic noises generated by a discharge tube 1.

DESCRIPTION OF THE TWELFTH PREFERRED EMBODIMENT

Figure 19:
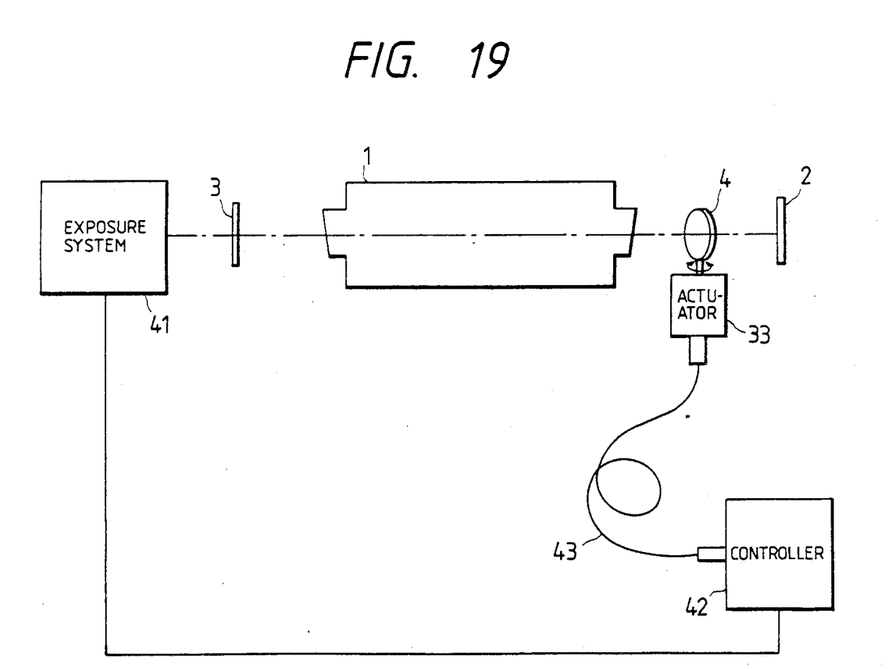
FIG. 19 is a diagram of a laser apparatus according to a twelfth embodiment of this invention.

FIG. 19 shows a twelfth embodiment of this invention which is similar to the embodiment of FIG. 18 except for the following design changes.

An exposure system 41 using laser light includes a wavelength sensor detecting a wavelength of the laser light. An output signal from the wavelength sensor is applied to a controller 42. The controller 42 generates an optical control signal in accordance with the output signal from the wavelength sensor. The optical control signal is guided from the controller 42 to an etalon actuator 33 by an optical fiber cable 43. Accordingly, the control signal to the etalon actuator 33 is protected from electromagnetic noises generated by a discharge tube 1.

What is claimed is:

1. In a laser apparatus including an optical resonator having a laser medium containing excimer gas, said resonator generating a laser light, the improvement comprising:
   (a) a wavelength narrowing and selecting element comprising an optical element disposed along an optical axis of the apparatus for selecting in response to density of a gas contacting said selection element a given wavelength of the laser light by narrowing the spectral bandwidth and tuning the center wavelength of the laser light, the selected wavelength residing within a continuous gain bandwidth of the laser medium, said element comprising air space etalon means for selecting and tuning said center wavelength; and
   (b) a sealed container housing the wavelength narrowing and selecting element,
      wherein the gas in the sealed container differs from the laser medium gas, is at a different pressure from a gas pressure of the laser medium, and does not absorb the laser light, and
      wherein said sealed container is separated from said resonator.

2. The laser apparatus of claim 1 wherein the sealed container is filled with an inert gas.

3. In a laser apparatus including an optical resonator having a laser medium containing excimer gas, said resonator generating a laser light, the improvement comprising:
   (a) a wavelength narrowing and selecting element along an optical axis of the apparatus for selecting a given wavelength of the laser light by narrowing the spectral bandwidth and tuning the center wavelength of the laser light, the selected wavelength residing within a continuous gain bandwidth of the laser medium, said element comprising air space etalon means for selecting and tuning said center wavelength; and
   (b) a sealed container housing the wavelength narrowing and selecting element, wherein a pressure within the sealed container is lower than an atmospheric pressure,
      wherein the gas in the sealed container differs from the laser medium gas and does not absorb the laser light, and
      wherein said sealed container is separated from said resonator.

4. In a laser apparatus including an optical resonator having a laser medium containing excimer gas therein, said resonator generating a laser light having a band of wavelengths which corresponds to a continuous gain bandwidth of the laser medium, the improvement comprising:
   (a) a sealed container filled with a gas;
   (b) a wavelength narrowing and selecting element disposed within the sealed container and selecting a wavelength of the laser light within the continuous gain bandwidth of the laser medium by narrowing the spectral bandwidth and tuning the center wavelength of the laser light, said narrowing and selecting element responsive to a density of the gas within the sealed container by narrowing the spectral bandwidth and tuning the center wavelength, the selected wavelength thereby determining a central wavelength of a laser light outputted from a combination of the optical resonator and the wavelength narrowing and selecting element; and
   (c) means for varying the density of the gas within the sealed container thereby to vary the central wavelength of the output laser light,
      wherein the gas in the sealed container differs from the laser medium gas and does not absorb the laser light, and
      wherein said sealed container is separated from said resonator.

5. The laser apparatus of claim 4 further comprising means for detecting the central wavelength of the output laser light, means for determining a target wavelength, means for deriving a difference between the detected central wavelength and the target wavelength, and means for controlling the density-varying means in response to the derived difference to hold the central wavelength of the output laser light essentially at the target wavelength.

6. The laser apparatus of claim 5 further comprising means for varying the target wavelength to vary the central wavelength of the output laser light.

7. The laser apparatus of claim 4 wherein the gas within the sealed cotainer includes an inert gas.

8. In a laser apparatus including an optical resonator having a laser medium containing excimer gas for generating a laser light, the improvement comprising:
   (a) a sealed container filled with gas and separated from said resonator;
   (b) a wavelength selection element disposed within the sealed container and selecting a wavelength of the laser light; and
   (c) means for detecting a central wavelength of a laser light outputted from a combination of the optical resonator and the wavelength selection element; and
   (d) means for adjusting a density of the gas within the sealed container in response to the detected central wavelength of the output laser light thereby to provide feedback control of the central wavelength of the output laser,
      wherein the gas in the sealed container differs from the laser medium gas and does not absorb the laser light.

9. The laser apparatus of claim 8 wherein the gas within the sealed container includes an inert gas.

10. The laser apparatus of claim 8 wherein the wavelength detecting means comprises a second sealed container, a wavelength dispersion element disposed within the second sealed container and forming a spectrum pattern of the output laser light, means for sensing the spectrum pattern, and means for determining the central wavelength of the output laser light in accordance with the sensed spectrum pattern.

11. The laser apparatus of claim 8 wherein the wavelength detecting means outputs a signal to the controlling means via an optical fiber cable.

12. In a laser apparatus including an optical resonator having a laser medium containing excimer gas for generating a laser light, the improvement comprising:
   (a) a sealed container filled with a gas different from the laser medium gas;
   (b) a wavelength dispersion element disposed within the sealed container and forming a spectrum pattern of the output laser light;
   (c) means for sensing the spectrum pattern; and
   (d) means for determining a wavelength of the output laser light in response to the sensed spectrum pattern.

13. The laser apparatus of claim 12 wherein the sealed container is filled with an inert gas.

14. The laser apparatus of claim 12 wherein the wavelength determining means comprises means for calculating an integral of an intensity of light in the spectrum pattern located in a shorter wavelength side of a reference point, means for calculating an integral of an intensity of light in the spectrum pattern located in a longer wavelength side of the reference point, means for comparing the calculated integrals, and means for calculating the wavelength on the basis of the comparison between the integrals.

15. In a laser apparatus including an optical resonator having a laser medium containing excimer gas therein, said resonator generating a laser light within a band of wavelengths and a wavelength narrowing and selecting means for selecting a wavelength of the output laser light, the improvement comprising:

means for reducing variation in a wavelength of the laser output, said means including means for maintaining constant a density of a gas surrounding said wavelength narrowing and selecting means, said means for maintaining including a sealed container enclosing said gas surrounding said wavelength narrowing and selecting means, said gas differing from said laser medium and nonabsorptive of the output laser light, whereby a refractive index of the gas is maintained substantially constant, thereby to reduce variation in said wavelength of the laser output.

16. An improved laser apparatus as recited in claim 15 further comprising means for varying said density of said gas, thereby to control said wavelength of the laser output.

17. An improved laser apparatus as recited in claim 16 wherein said means for varying is included in a feedback structure, said feedback structure including means for detecting variation in said wavelength of the laser output and means for controlling said means for varying in response to detection of variation in said wavelength, thereby to maintain substantially constant the wavelength of the laser output.

* * * * *